M. MENNIS & W. A. MEAD.
TAILOR'S MEASURING APPARATUS.
APPLICATION FILED AUG. 16, 1912.

1,092,737.

Patented Apr. 7, 1914.

2 SHEETS—SHEET 2.

Witnesses
Wm. F. Mulligan.
John J. McCarthy

Inventor
May Mennis.
William A. Mead.
By Victor J. Evans.
Attorney

UNITED STATES PATENT OFFICE.

MAY MENNIS AND WILLIAM A. MEAD, OF DENVER, COLORADO.

TAILOR'S MEASURING APPARATUS.

1,092,737.  Specification of Letters Patent.  Patented Apr. 7, 1914.

Application filed August 16, 1912. Serial No. 715,475.

*To all whom it may concern:*

Be it known that we, MAY MENNIS and WILLIAM A. MEAD, citizens of the United States of America, residing at Denver, in the county of Denver and State of Colorado, have invented new and useful Improvements in Tailors' Measuring Apparatus, of which the following is a specification.

This invention relates to improvements in tailors' measuring apparatus and, in the present instance, is directed more particularly to an apparatus for measuring women's forms so that custom gowns and suits may be made with accuracy, it of course being understood that the invention in its useful application is not limited to the particular application of the same as herein set forth, as the same is equally applicable to ascertain the measurements of a man.

In carrying out the present invention, it is our purpose to provide an apparatus of the character described by means of which the outline of a person's form may be ascertained with ease and facility so as to give the outline and enable the proper reproduction of each individual figure whereby custom gowns, suits and the like may be made with accuracy.

It is also our purpose to provide a device of this type which will embrace the desired features of simplicity, efficiency and durability coupled with cheapness of cost in manufacture and marketing and which will be reliable and convenient in use.

With the above and other objects in view, the invention consists in the construction, combination and arrangement of parts hereinafter set forth in and falling within the scope of the claim.

Figure 1:
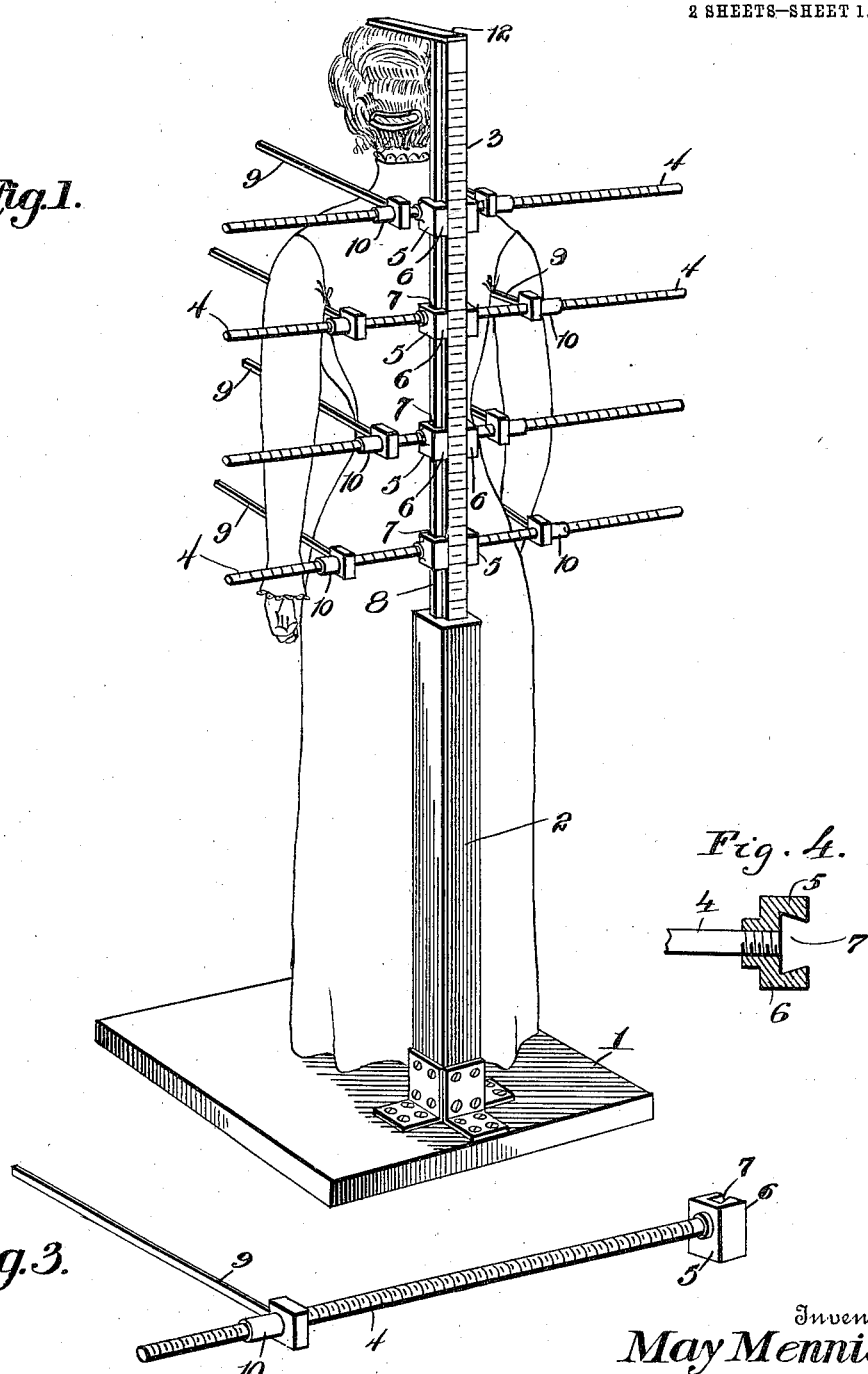
Figure 2:
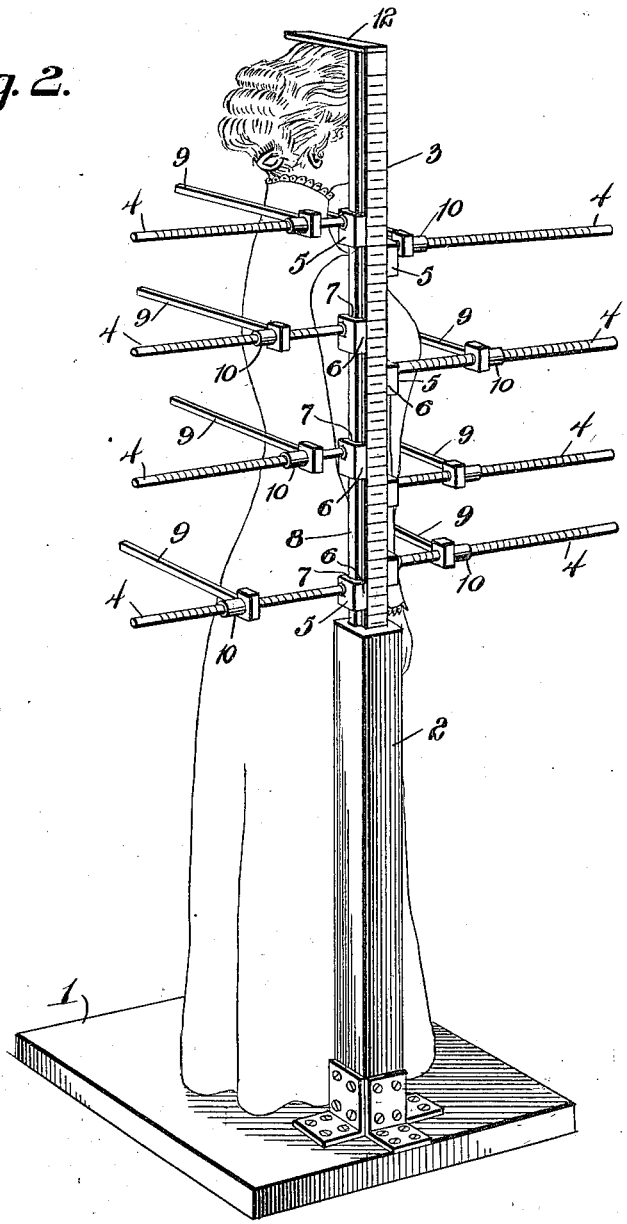

In the accompanying drawings: Figure 1 is a perspective view of a measuring apparatus constructed in accordance with the present invention and showing a person in one measuring position on the platform of the same. Fig. 2 is a similar view showing the person in another position upon the platform of the same, and Fig. 3 is an enlarged perspective view of a detail of the invention. Fig. 4 is a view of a detail of the invention.

Referring now to the accompanying drawings in detail, the numeral 1 designates a base which may be constructed of any suitable material and of any preferred or well known form. Rigidly fastened to the base adjacent to one end thereof is a vertical hollow standard 2 also constructed of any suitable material and mounted within the standard 2 and extending upwardly therefrom is an upright 3 appropriately graduated or marked off for measuring the height of the person upon the platform. This upright is preferably slidably disposed within the standard so that the same may be removed when desired and, if found desirable, a suitable clamping device may be employed to hold the upright at any desired elevation so that the height of the person being measured may be ascertained with ease. Extending laterally from the opposite sides of the upright 3 and projecting in relatively opposite directions, are cross bars 4 which, in the present instance, are constructed of steel tubing suitably graduated along their lengths.

In the embodiment of our invention selected for illustrative purposes, each cross bar is secured to the respective side of the upright by means of a cleat 5 having the marginal edges thereof turned upon themselves as at 6 and spaced apart to form a dovetailed guide way 7 slidably receiving a similarly shaped track 8 formed upon the respective side of the upright, or fastened thereto in any suitable manner, each cleat having a threaded aperture to receive one end of the particular cross bar, the adjacent end of each bar engaging the respective track to bind the cleats to the upright and prevent accidental sliding movement of the bars. From this construction, it will be seen that the cross bars at each side of the upright are movable thereon independently of one another and independently of those on the opposite side whereby such bars may be moved or adjusted to any desired position relatively to one another to enable the measuring of the particular points on the figure so that the desired outline may be reproduced. Although we have shown and described one particular construction of these cross bars and a certain form of fastening means for securing the same to the upright, we wish it to be understood that we do not confine ourselves to this precise structure, as the bars may be constructed of any suitable material and may be of any formation in cross dimensions and any suitable fastening means for securing the bars to the upright may be employed. Secured to each cross bar 4 and projecting at right angles thereto is an arm 9 which, in the present instance, has one end formed with a sleeve 10 receiving the respective bar and splined thereon for sliding movement, the arms being movable on the bars toward and away from one another and independently of one another and are designed to embrace the figure being measured so that the depth and breadth of the person at the desired points may be accurately determined, the measurements being read from the graduations upon the cross bars. A suitable cap 12 is fastened to the upper extremity of the upright 3 and rests upon the head of the person being measured so that the height of such person may be determined and the upright held against accidental downward movement in the taking of the measurements of the depth and breadth or width of the person.

From the foregoing description taken in connection with the accompanying drawings, the construction and manner of employing our invention will be readily apparent. In Fig. 1 of the drawings we have shown the manner of employing our invention for measuring the breadth or width of the person, and in this use of the apparatus, the upper cross bars 4, 4 at the opposite sides of the upright are disposed adjacent to the neck of the person while the arms 9, 9 on such bars incase the neck to determine the width thereof. On the next lower pair of cross bars, the arms 9, 9 are disposed beneath the arm pits so that the breadth of the person at this point may be ascertained, while the arms on the succeding pair of bars embrace the waist, the following cross bars, that is, the last pair in the present instance, being disposed an appropriate distance below the waist line and having the arms thereon embracing the hips so that the width or breadth of the person at this point may be readily determined.

In Fig. 2 of the drawings, we have shown our invention as utilized for obtaining the depth of the person to be measured and in this case, the bars at each side of the upright are stepped relatively to those at the opposite side. For example, the bars of the upper pair are disposed one above the other so that the arms thereon will enable the correct measurements of the depth of the neck, while the bars of the next lowest pair are stepped relatively to each other so that the arms thereon will enable the depth of the bust of the person to be determined, the bars of the following pair being also stepped relatively to each other so that the arms thereon will embrace the waist and facilitate the correct measuring of the depth thereof, the bars of the following pair, the last in this embodiment of our invention, being also stepped with respect to each other and disposed an appropriate distance below the waist line, so that the proper measurements may be taken at this point to determine the depth.

It will be noted that we have provided a simple, yet efficient and reliable form of tailors' measuring apparatus and one wherein all the requisite points upon the person may be measured so that custom gowns, suits and the like may be made with accuracy.

While we have herein shown and described one preferred form of our invention, it is to be understood that we do not limit ourselves to the precise details of construction herein described and delineated, as modification and variation may be made within the scope of the claim and without departing from the spirit of the invention.

We claim:

A measuring apparatus comprising a hollow standard, a graduated upright mounted within the standard and provided with tracks at the opposite sides thereof, cleats engaging with the tracks and slidable thereon, cross bars secured to said cleats and adapted to engage the track ways to bind the cleats to the track ways and prevent accidental movement thereof, and arms secured to said cross bars and projecting at right angles thereto and adapted to embrace the person being measured.

In testimony whereof we affix our signatures in presence of two witnesses.

MAY MENNIS.
WILLIAM A. MEAD.

Witnesses:
NETTIE KIRBY,
A. M. PATTEN.

---

Copies of this patent may be obtained for five cents each, by addressing the "Commissioner of Patents, Washington, D. C."